United States Patent [19]
Diehl et al.

[11] Patent Number: 5,997,608
[45] Date of Patent: Dec. 7, 1999

[54] PROCESS FOR THE PRODUCTION OF MOLTEN PIG IRON OR MOLTEN STEEL, PRE-PRODUCTS AND SPONGE IRON AND A PLANT FOR CARRYING OUT THE PROCESS

[75] Inventors: Jörg Diehl, Linz; Gerald Rosenfellner, St. Peter/Au; Leopold Werner Kepplinger, Linz; Konstantin Milionis, Stiefling; Dieter Siuka, Neuhofen; Horst Wiesinger, Linz, all of Austria

[73] Assignee: Voest-Alpine Industrieanlagenbau GmbH, Linz, Austria

[21] Appl. No.: 08/817,262

[22] PCT Filed: Oct. 12, 1995

[86] PCT No.: PCT/AT95/00198

§ 371 Date: Jul. 22, 1997

§ 102(e) Date: Jul. 22, 1997

[87] PCT Pub. No.: WO96/12044

PCT Pub. Date: Apr. 25, 1996

[30]  Foreign Application Priority Data

Oct. 17, 1994 [AT] Austria ..................... 1958/94
Apr. 25, 1995 [AT] Austria ..................... 709/95
Apr. 25, 1995 [AT] Austria ..................... 710/95

[51] Int. Cl.$^6$ .................................................. C21B 11/00
[52] U.S. Cl. ................................ 75/446; 75/450; 75/492; 75/505; 266/156; 266/160; 266/172
[58] Field of Search .................. 75/492, 450, 505, 75/446; 266/156, 160, 172

[56]  References Cited

U.S. PATENT DOCUMENTS 5,238,487  8/1993  Hauk et al. ............................. 75/492
5,676,732  10/1997  Viramontes-Brown et al. ......... 75/492

FOREIGN PATENT DOCUMENTS 396255  7/1993  Austria.
0487856  6/1992  European Pat. Off..

Primary Examiner—Melvyn Andrews
Attorney, Agent, or Firm—Ostrolenk, Faber, Gerb & Soffen, LLP

[57]  ABSTRACT

In a process for the production of molten pig iron or molten steel pre-products and sponge iron from charging materials consisting of iron ore and, if desired, fluxes, direct reduction of the charging materials to sponge iron is carried out in a fixed-bed reduction zone, the sponge iron is melted in a meltdown gasifying zone under supply of carbon carriers as well as an oxygen-containing gas and a CO- and $H_2$-containing reducing gas is produced which is fed to the reduction zone, is reacted there and is drawn off as an export gas, and the drawn-off export gas is subjected to $CO_2$ elimination and for the production of sponge iron is along with part of the reducing gas formed in the meltdown gasifying zone as an at least largely $CO_2$ free reducing gas conveyed to a further reduction zone for the direct reduction of iron ore. In order to save investment costs incurred for the plant and to increase productivity, part of the reducing gas produced in the meltdown gasifying zone is branched off and fed to the further reduction zone while avoiding $CO_2$ elimination.

20 Claims, 3 Drawing Sheets

PROCESS FOR THE PRODUCTION OF MOLTEN PIG IRON OR MOLTEN STEEL, PRE-PRODUCTS AND SPONGE IRON AND A PLANT FOR CARRYING OUT THE PROCESS

The invention relates to a process for the production of molten pig iron or molten steel pre-products and sponge iron from charging materials consisting of iron ore, preferably lumpy and/or pelletized iron ore, and, if desired, fluxes, wherein direct reduction of the charging materials to sponge iron is carried out in a first reduction zone, the sponge iron is melted in a meltdown gasifying zone under supply of carbon carriers as well as an oxygen-containing gas and a CO- and $H_2$-containing reducing gas is produced which is fed to the first reduction zone, is reacted there and is drawn off as an export gas, and wherein the drawn-off export gas is subjected to $CO_2$ elimination and for the production of sponge iron is along with part of the reducing gas formed in the meltdown gasifying zone as an at least largely $CO_2$ free reducing gas conveyed exclusively to a further reduction zone for the direct reduction of iron ore, and a plant for carrying out the process.

A process of this type is known from AT-B - 396.255. There, the portion of the reducing gas produced in the meltdown gasifying zone that forms as an excess gas and is supplied to the additional reduction zone is washed in a scrubber, is subsequently mixed with the export gas and is finally subjected to $CO_2$ stripping along with the export gas. Thus, this portion of the reducing gas is added to the export gas before the $CO_2$ stripping is effected, so that the two reduction processes—each of them individually embodying a system that is subject to oscillations—are connected with each other at a point which—if viewed from the gas stream—is situated closely after the first reduction process and far away from the second process. Thereby it becomes feasible to minimize or avoid possible effects of oscillation transfers between the systems, resonances and feedback with regard to gas throughputs, gas compositions and gas temperatures, namely by homogenizing or cushioning the various deviations from the designated desired values. For example, fluctuations in gas volume and flow arise from the demand to maintain a constant system pressure of the melter gasifier for the purpose of producing a reducing gas of a steady quality. As soon as the pressure in the melter gasifier becomes too high, a relaxation is effected by increasing the supply of reducing gas to the export gas duct.

The dimensions of a $CO_2$ stripping means are, alongside other criteria, largely a function of the flow volume which is to be supplied to the plant, and in this connection, in accordance with AT-B - 396.255, the maximum reduction gas flow to be expected has to be taken into account. Since the $CO_2$ stripping means accounts for an essential part of the overall investment incurring in connection with a plant for carrying out a process of the initially described kind, the investment costs for a plant according to AT-B - 396.255 are very high.

The invention has as its object to develop further the process known from AT-B - 396.255 as well as the plant known from the said document in such a way as to enable substantial savings in terms of investment costs. In particular, it is to be feasible to decrease the amount of energy required for producing the product.

With a process of the initially defined kind, this object of the invention is achieved in that from the part of the reducing gas produced in the meltdown gasifying zone and conveyed exclusively to the further reduction zone a portion is branched off and fed to the further reduction zone hile avoiding $CO_2$ elimination and that the export gas subjected to $CO_2$ elimination is heated.

Consequently it is feasible according to the invention to dimension a plant for $CO_2$ elimination for a substantially lower capacity, whereby investment costs are lowered substantially. Surprisingly, it emerged that moving the linkage point of the two reduction processes closer to the further reduction zone entails no negative effects on the overall process. In the event that substantial fluctuations in terms of gas volume and gas flow have to be anticipated, it is feasible to cushion these oscillations by means of safety measures, such as buffering, so that even in this case the advantages obtained in accordance with the invention become fully effective.

Austrian Patent Application A 1958/94 which enjoys an older priority discloses a process wherein lumpy ore is reduced to sponge iron in a fixed-bed direct reduction zone, the sponge iron is melted in a meltdown gasifying zone under supply of carbon carriers and oxygen-containing gas and a CO- and $H_2$-containing reducing gas is produced which is fed to the fixed-bed direct reduction zone, is reacted there and is drawn off as a top-gas, and fine ore is reduced to sponge iron in a fluidized-bed direct reduction zone according to the fluidized bed method, wherein top-gas from the fixed-bed direct reduction zone and/or reducing gas produced in the meltdown gasifying zone which are subjected to $CO_2$ stripping and heating, as well as offgas forming in the fluidized-bed direct reduction zone are fed to the fluidized-bed direct reduction zone and drawn off as an offgas. There, the reducing gas produced in the meltdown gasifying zone can be fed to the fluidized-bed direct reduction zone while avoiding $CO_2$ stripping.

From EP-A - 0 487 856 a process is known for producing pig iron or sponge iron, wherein in a melt-down gasifying zone a reducing gas is formed which in a similar manner is supplied both to a first and to a further reduction zone arranged so as to be connected in parallel. The topgas withdrawn from the two reduction zones is subjected to $CO_2$ scrubbing and the topgas purified from $CO_2$ is supplied to the melter gasifier and, again in the same manner, both to the first and to the further reduction zone.

A preferred embodiment according to the invention is characterized in that in the further reduction zone sponge iron is produced from iron ore, preferably lumpy and/or pelletized iron ore, utilizing the fixed-bed method.

Advantageously, according to the invention the branched-off portion of the reducing gas prior to being introduced into the further fixed-bed direct reduction zone is mixed with the export gas subjected to $CO_2$ elimination under formation of a mixed reducing gas.

Whenever it is important that the reducing gas which is fed to the fixed-bed direct reduction zone should be particularly dustfree, advantageously the branched-off portion of the reducing gas is subjected to dedustification and scrubbing and the mixed reducing gas is subjected to heating.

Further substantial savings in terms of investment costs and energy expenditures for the production of the pig iron and/or steel pre-product can be achieved by subjecting only the portion of the export gas subjected to $CO_2$ elimination to heating and after having been heated mixing it with the branched-off portion of the reducing gas which avoids both $CO_2$ elimination and heating, wherein advantageously the branched-off portion of the reducing gas is only subjected to dedustification but not to scrubbing.

Thus, the branched-off portion of the reducing gas is here only subjected to a rough purification and while in a very hot state is mixed with the export gas which has been subjected to heating. Accordingly, the heating means can be dimensioned much smaller, since a substantially lower gas flow volume has to be heated. Moreover, due to the fact that the branched-off reducing gas is still hot, the export gas has to be heated only to a lower temperature.

By being mixed with the heated export gas, the residual dust content still existing in the branched-off reducing gas is diluted to such an extent that the reduction taking place in the fixed-bed direct reduction zone is not affected at all.

A preferred variant is characterized in that the branched-off portion of the reducing gas is subjected to dedustification and scrubbing and the export gas subjected to $CO_2$ elimination is heated up to a temperature lying slightly above the desired temperature for the reducing gas for the further reduction zone. Thereby it becomes feasible to admix the branched-off portion of the reducing gas to the export gas freed from $CO_2$ in a very pure, yet cooler state, with lower investment costs incurring for the heating means if compared with the prior art. Moreover, the process is easy to operate as the branched-off reducing gas can be handled more easily while in a cooler state and thus only a small investment is required with regard to the plant.

Advantageously, in order to maintain constant the various system pressures and flow volumes, in view of a possible excess supply the branched-off portion of the reducing gas is stored prior to being introduced into the further reduction zone.

In order to minimize oscillation transfers from one reduction process to the other, advantageously deviations in pressure within the meltdown gasifying zone are balanced out by admixing a portion of the reducing gas formed in the meltdown gasifying zone to the export gas drawn off the reduction zone, prior to effecting the $CO_2$ elimination of the export gas.

Advantageously, in the further reduction zone fine ore is reduced in the fluidized bed process and the branched-off reducing gas is supplied to the further reduction zone while avoiding heating of the export gas, wherein suitably direct reduction in the fluidized bed process is effected in two or several steps.

A plant for carrying out the process, including a reduction furnace for iron ore, preferably lumpy and/or pelletized iron ore, a melter gasifier, a feed duct for a reducing gas connecting the melter gasifier with the reduction furnace, a conveying duct for the reduction product produced in the reduction furnace connecting the reduction furnace with the melter gasifier, with an export gas-discharge duct departing from the reduction furnace and opening into a $CO_2$ elimination plant, with feed ducts for oxygen-containing gases and carbon carriers running into the melter gasifier, a tap for pig iron and slag being provided at the melter gasifier, and with at least one additional reduction reactor intended to receive iron ore, a reducing gas feed duct departing from the $CO_2$ elimination plant and leading to the reduction reactor, with the $CO_2$ elimination plant being flow-connected exclusively with the reduction reactor, an offgas discharge duct leading out of this reduction reactor and a discharging means for the reduction product formed in this reduction reactor, characterized in that the reducing gas-feed duct of the additional reduction reactor runs into the additional reduction reactor via a heating means for the export gas freed from $CO_2$, and that from the feed duct for the reducing gas connecting the melter gasifier with the reduction furnace a branch duct departs which runs into the reducing gas feed duct of the additional reduction reactor while avoiding the $CO_2$ elimination plant.

Suitably, the additional reduction reactor is designed as a fixed-bed reactor, in particular a shaft furnace.

According to a preferred embodiment the branch duct runs into the reducing gas feed duct of the additional reduction reactor while avoiding both the $CO_2$ elimination plant and the heating means which may optionally include an afterburning means.

According to a preferred embodiment the additional reduction reactor is designed as a fluidized bed reactor, wherein advantageously two or several fluidized bed reactors are provided which are connected in series.

Advantageously a compensation tank is provided in the branch duct, wherein suitably the compensation tank may be bypassed by a bypass duct.

In order to minimize possible oscillation transfers between the two reduction processes, suitably the branch duct is connectible with the export gas discharge duct via a compensating duct prior to the entry of the same into the $CO_2$ elimination plant.

Furthermore, the invention relates to a process for the production of a commercially apt product, such as rolling stock, produced from pig iron or steel pre-products, produced by a process according to the invention.

BRIEF DESCRIPTION OF THE DRAWINGS

In the appended drawings, each of FIGS. 1, 2 and 3 diagrammatically illustrates an embodiment of this invention.

DESCRIPTION OF THE PREFERRED EMBODIMENTS

Figure 1:
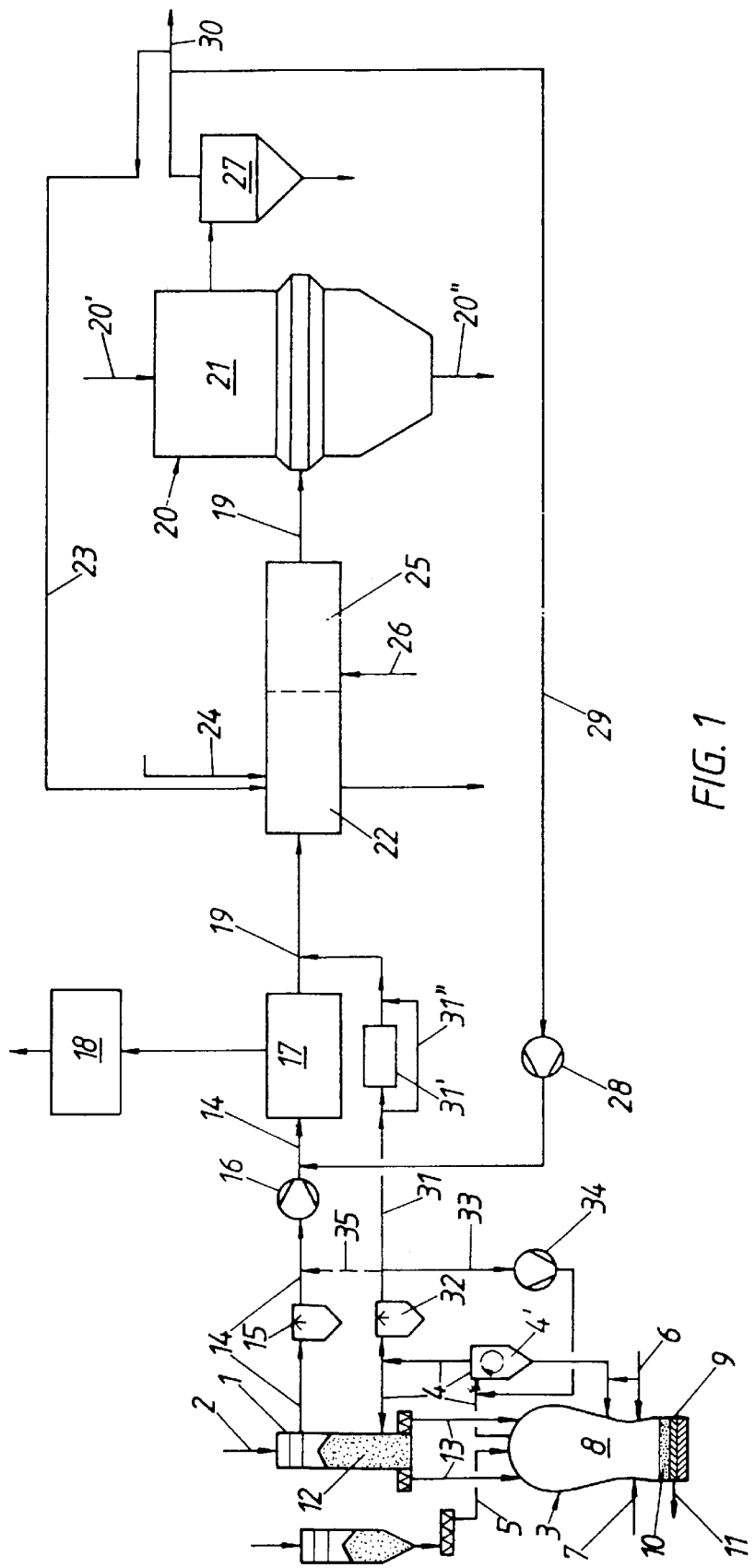

Lumpy and/or pelletized iron ore is top-charged into a first reduction shaft furnace 1 forming a fixed-bed reactor by a conveying means 2 via a sluice system not illustrated, optionally along with fluxes. The shaft furnace 1 communicates with a melter gasifier 3, in which a reducing gas is produced from coal and oxygen-containing gas, which reducing gas is fed to the shaft furnace 1 through a feed duct 4, a gas scrubbing means 4' for dry dedustification optionally being provided in the feed duct 4.

The melter gasifier 3 comprises a supply duct 5 for solid carbon carriers, a feed duct 6 for oxygen-containing gases as well as, if desired, supply ducts 7 for carbon carriers that are liquid or gaseous at room temperature, such as hydrocarbons, as well as for burnt fluxes. Molten pig iron 9 and liquid slag 10 collect within the melter gasifier 3 below the meltdown gasifying zone 8 and are tapped via a tap 11.

The iron ore reduced to sponge iron in the shaft furnace 1 in a fixed-bed direct reduction zone 12, i.e. in the fixed bed method, is supplied along with the fluxes burnt in the direct reduction zone 12 through a conveying duct 13 connecting the shaft furnace 1 with the melter gasifier 3, for instance, by means of delivery worms or the like. An export-gas discharge duct 14 for the top gas forming from the reducing gas in the direct reduction zone 12 is connected to the top of the shaft furnace.

The top-gas drawn off via the export gas discharge duct 14 is first subjected to purification in a scrubber 15, to free it from dust particles as completely as possible and to lower its steam content, so as to be available for further use as an export gas. Subsequently, by means of a compressor 16, the export gas is conveyed to a $CO_2$ elimination or stripping means 17 (f.i. a $CO_2$ scrubber or a pressure swing adsorption plant), where it is freed from $CO_2$ as completely as possible. The offgas leaving the $CO_2$ stripping means 17 is optionally conveyed to a desulphurization means 18. Via a reducing gas feed duct 19 the export gas thus freed from $CO_2$ is conveyed to a second fixed-bed reactor designed as a reduction-shaft furnace 20, which, like the first shaft furnace 1, also works on the counterflow principle. In this second shaft furnace 20 lumpy and/or pelletized iron ore is also subjected to direct reduction in a fixed-bed reduction zone 21. The ore feed duct is labeled 20' and the sponge iron discharging means 20".

Since the export gas has undergone substantial cooling during purification, it is subjected to heating prior to being fed to the second reduction shaft furnace 20. The heating is effected in two steps: First the purified export gas is subjected to indirect heating in a first step, wherein a heating means 22 utilized for this purpose is designed as a heat exchanger. The heat exchanger 22 (recuperator) is operated with purified export gas drawn off the second reduction shaft furnace 20 via a duct 23. In addition, an oxygen-containing gas (oxygen is present in molecular form), such as air, is fed to the burner of the heat exchanger 22 via a duct 24. Subsequently, the heated export gas is subjected to afterburning, in the afterburning means 25, where part of the purified export gas is burnt under oxygen supply 26. Hereby, the purified export gas attains the temperature required for the reduction in the second reduction shaft furnace 20, which lies within a temperature range of 600 and 900° C.

The top-gas drawn off the second reduction shaft furnace 20 is likewise subjected to purification and cooling in the export gas scrubber 27, in order to purify it from dust particles and to lower the steam content, whereupon it is available as an export gas for further use. Part of the export gas is fed to the heat exchanger 22 via the duct 23. A further portion of the export gas forming in the second reduction shaft furnace 20 is also conveyed to the $CO_2$ stripping means 17 via a compressor 28, either directly or, in accordance with the illustrated exemplary embodiment, via the conveying duct 29 running into the export gas discharge duct 14, and is then after $CO_2$ stripping available as a recycle reducing gas for the second reduction shaft furnace 20. Part of the export gas from the second reduction shaft furnace 20 is made available for other purposes of use via the export gas duct 30.

Part of the reducing gas formed in the melter gasifier 3 is, in accordance with FIG. 1, fed to a wet scrubber 32 via a branch duct 31 departing from the feed duct 4 and after purification has been effected is mixed with the export gas freed from $CO_2$ leaving the $CO_2$ stripping means 17 by means of the branch duct 31 running into the reduction gas feed duct 19. The mixing is effected before the reduction gas feed duct 19 runs into the heat exchanger 22, so that the portion of the reducing gas formed in the melter gasifier 3 which has been cooled in the scrubber 32 is also supplied to the heat exchanger 22 and to the subsequently arranged afterburning means 25 for being heated to the temperature required for direct reduction. In the branch duct 31 a compensation tank 31' is provided by means of which the flow volume of the reducing gas admixed to the export gas freed from $CO_2$ (along with recycle reducing gas) via the branch duct 31 can be kept largely constant. The compensation tank 31' can be designed as a high-pressure- or else as a low-pressure reservoir. The compensation tank 31' can be bypassed via a bypass duct 31".

Part of the reducing gas emerging from the scrubber 32 is recycled into the feed duct 4 via a duct 33 including a compressor 34, in order to condition the reducing gas leaving the melter gasifier in a very hot state prior to its entry into the gas purification means 4', in particular to cool it down to a temperature range which is advantageous for the direct reduction process in the shaft furnace 1. Optionally, a reducing gas can be admixed to the export gas emerging from the shaft furnace 1 via a compensating duct 35 sketched in a broken line in order to maintain a constant system pressure - by dividing the momentum of the pressure among the ducts 35 and 31.

Since according to the invention a considerable part of the flow volume of the reducing gas fed to the second reduction shaft furnace 20 is not supplied to the $CO_2$ stripping means 17 but—viewed in the flow direction of the reducing gas—is only mixed with the part of the reducing gas emerging from the $CO_2$ stripping means 17 afterwards, a substantial reduction in the size of the $CO_2$ stripping means 17 is made possible.

According to the invention, up to some 30% (even more, under special circumstances) of the investment costs for the $CO_2$ stripping means 17 can be saved. A further essential advantage of the invention is that there also results a lesser flow volume of offgas emerging from the $CO_2$ stripping means 17, which entails savings in terms of the investment necessary for the desulphurization means 18.

Moreover, an increase in the yield of reducing agents from the reducing gas conveyed to the second shaft furnace 20 results, since from the reducing gas which is conveyed to the shaft furnace 20 while avoiding the $CO_2$ stripping means 17 no reducing agents can be carried out along with the offgas from the $CO_2$ stripping means 17. This also enables a higher $CO_2$ residual gas content of the export gas subjected to $CO_2$ stripping, thereby entailing further savings both with regard to the planning and operation of the $CO_2$ stripping means 17 as well as a wider range of tolerance with regard to fluctuations in the $CO_2$ content of the export gas freed from $CO_2$. This entails simplifications in terms of operation and control engineering.

In sum this leads to an improvement in the quality of the reducing gas fed to the second shaft furnace 20 and consequently to an increase in productivity.

Figure 2:
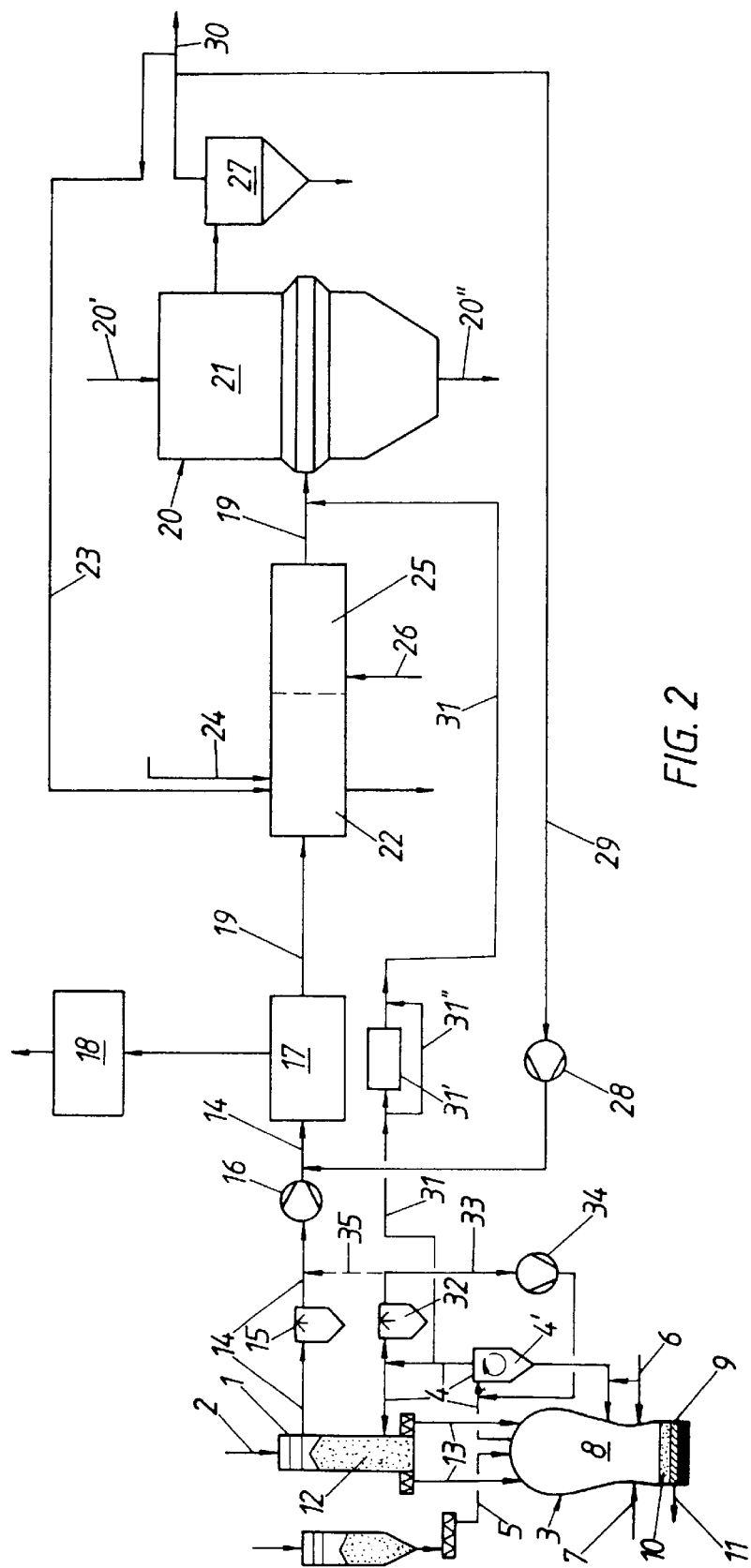

According to the embodiment illustrated in FIG. 2, part of the reducing gas produced in the melter gasifier after passing through a dust stripping cyclone 4' is admixed unscrubbed, i.e. without streaming through a scrubber, in the hot state to the reduction gas mixture formed by recycle reducing gas and export gas freed from $CO_2$ via the branch duct 31, after this reduction gas mixture has passed through the heat exchanger 22 and the afterburning means 25. In addition to the advantages offered by the embodiment illustrated in FIG. 1 this makes it possible to supply the sensible heat of the reducing gas formed in the melter gasifier 3 to the direct reduction process in the further reduction shaft furnace 20 and thus to utilize it in an effective manner. This does not only enable savings with regard to the $CO_2$ stripping means 17 and with regard to the dimensioning of the heat exchanger 22 and the afterburning means 25, but it also entails energy savings during their operation.

Although the hot, branched-off reducing gas after having passed through the dust stripping cyclone 4' still shows a residual dust content, the system is able to cope with this without causing any failures, since by mixing this hot, branched-off reducing gas with the recycle reducing gas and the export gas subjected to purification from $CO_2$, the dust content is much diluted. Therefore, negative effects on the direct reduction process in the second reduction shaft furnace 20 are not to be anticipated.

Figure 3:
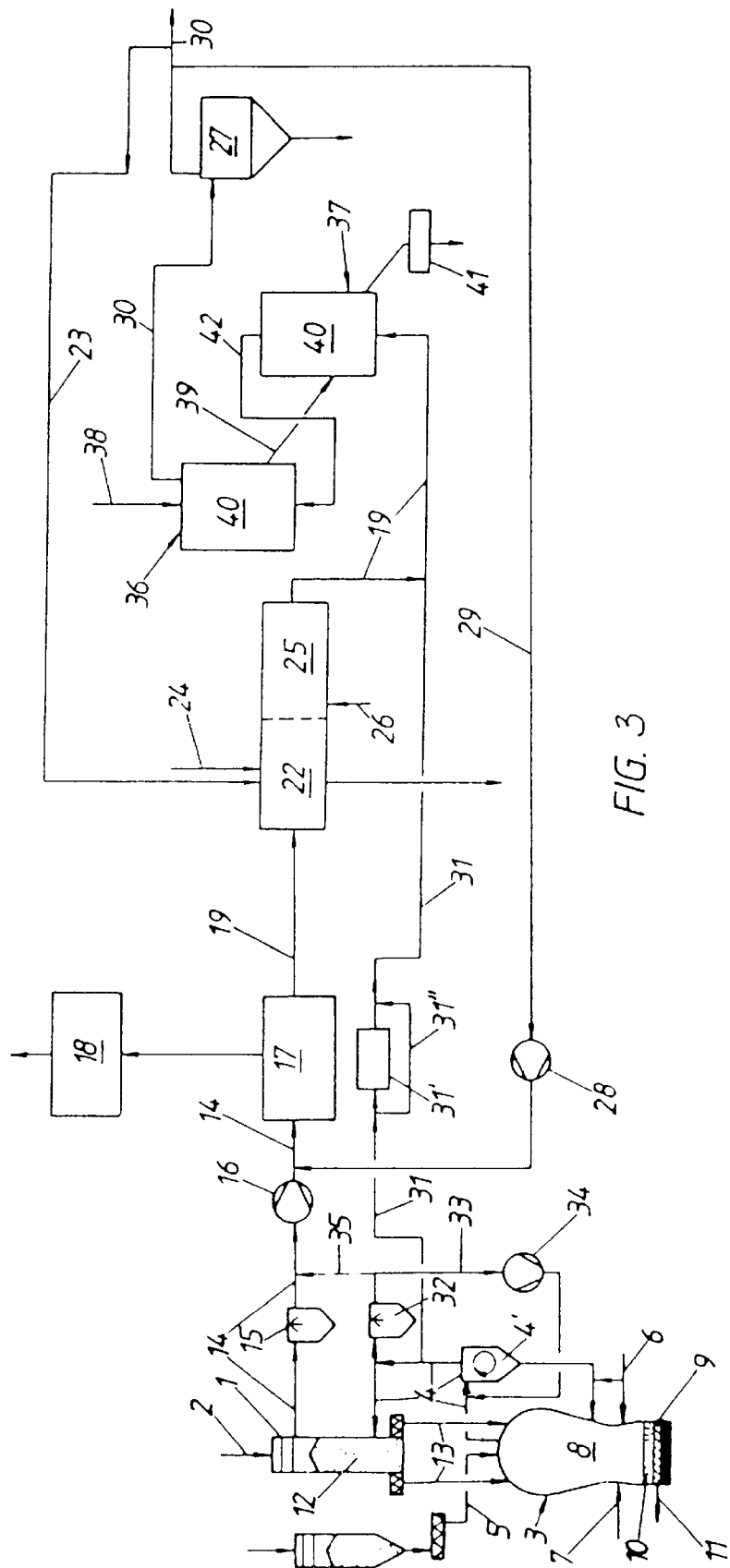

According to the embodiment of the invention illustrated in FIG. 3 two fluidized bed reactors 36, 37 consecutively arranged in series are provided as a further or, respectively, additional reduction reactor, fine ore being conducted via a fine-ore supply duct 38 to the first fluidized bed reactor 36 and from there via a conveying duct 39 to the consecutively arranged fluidized bed reactor 37. The material (sponge iron) reduced in one fluidized-bed direct reduction zone 40 each of the fluidized bed reactors 36, 37, after complete reduction and upon emergence from the second fluidized bed reactor 16, is supplied to a briquetting plant 41 where it is hot- or cold-briquetted. Prior to introducing the fine ore into the first fluidized bed reactor 36, it is subjected to an ore preparation, such as drying, which, however, is not illustrated in detail.

The reducing gas supplied to the fluidized bed reactor 37 via the reducing gas supply duct 19 is conducted through a gas duct 42 in counterflow to the ore flow, from the fluidized bed reactor 37 to the fluidized bed reactor 36, i.e. to the fluidized-bed direct reduction zones 40 provided in the fluidized bed reactors 36, 37, and is carried off the first fluidized bed reactor 36—viewed in the ore flow direction—as a topgas or, after purification, as an export gas through an export gas discharge duct 30.

The invention is not limited to the embodiments exposed in the description of the drawings, but is capable of being modified in various respects. For example it is feasible to provide for a reduction of fine ore utilizing the fluidized-bed method in lieu of the shaft furnace 1 which is operated according to the fixed-bed method, in other words: to replace the shaft furnace 1 with one or several fluidized bed reactors.

Further it is feasible to subject the branched-off portion of the reducing gas formed in the melter gasifier not only to dry dedustification but also to scrubbing, and to admix it after the heating means 22, 25 in the cold state to the export gas from the shaft furnace 1 which has been subjected to $CO_2$ elimination and heating. In this case the said export gas is heated to a slightly higher temperature in order to offset the admixture of the branched-off, cold portion of the reducing gas. However, with this method the heating means also has to be dimensioned essentially as a function of the flow volume of the export gas, so that this also renders it feasible to save investment costs as compared with the prior art.

If natural gas is available, a reformer can be provided in lieu of the $CO_2$ stripping means 17, rendering a separate heating means 22, 25 unnecessary in this case.

In the following, the process according to the invention is explained in greater detail in comparison with the process according to the prior art by way of two examples:

Example according to the prior art (listed values have been rounded): Export gas is drawn off a shaft furnace 1 of a plant arranged for example according to AT-B -396.255, is washed and is available in an amount of 167,411 $Nm^3/h$, having the chemical composition indicated in Table I.

TABLE I

| | |
|---|---|
| CO | 47% |
| $CO_2$ | 25% |
| $H_2$ | 22% |
| $H_2O$ | 2% |
| $H_2S$ | 100 ppm |
| $CH_4$ | 1% |
| $N_2$, Ar | 3% |

After compression in a compressor this gas is subjected to $CO_2$ scrubbing in a $CO_2$ stripping means.

$CO_2$-containing offgas escapes from the $CO_2$ stripping means in an amount of 50,811 $Nm^3/h$, having the chemical composition indicated in Table II, and has to be disposed of.

TABLE II

| | |
|---|---|
| CO | 14% |
| $CO_2$ | 77% |
| $H_2$ | 3% |
| $H_2O$ | 5% |
| $H_2S$ | 317 ppm |
| $CH_4$ | 1% |
| $N_2$, Ar | 1% |

The export gas which has been freed from $CO_2$ to a very large extent and is now available as a reducing gas for a further direct reduction process in an amount of 115,643 $Nm^3/h$ has a chemical composition as indicated in Table III.

TABLE III

| | |
|---|---|
| CO | 62% |
| $CO_2$ | 3% |
| $H_2$ | 30% |
| $H_2O$ | 0% |
| $H_2S$ | 6 ppm |
| $CH_4$ | 1% |
| $N_2$, Ar | 4% |

This reducing gas now has to be heated to temperature required for direct reduction. After having been heated it is available in an amount of 116,585 $Nm^3/h$ and has the chemical composition indicated in Table IV.

TABLE IV

| | |
|---|---|
| CO | 59% |
| $CO_2$ | 5% |
| $H_2$ | 28% |
| $H_2O$ | 2% |
| $H_2S$ | 6 ppm |
| $CH_4$ | 1% |
| $N_2$, Ar | 4% |

In the present example, no export gas resulting from the further reduction process is recycled, i.e. supplied to the $CO_2$ stripping means so as to be once again available as a reducing gas for the further direct reduction process.

Example according to the invention (listed values have been rounded): Export gas emerges from a shaft furnace 1 and after having been washed is available for further use in an amount of 127,458 $Nm^3/h$, having the chemical composition indicated in Table V.

TABLE V

| | |
|---|---|
| CO | 42% |
| $CO_2$ | 32% |
| $H_2$ | 20% |
| $H_2O$ | 2% |
| $H_2S$ | 100 ppm |
| $CH_4$ | 1% |
| $N_2$, Ar | 3% |

This export gas which has already been subjected to scrubbing is compressed by means of a compressor 16 and subjected to $CO_2$ stripping, such as $CO_2$ pressure swing adsorption in the $CO_2$ stripping means 17.

Offgas escapes from the $CO_2$ stripping means 17 in an amount of 47,011 $Nm^3/h$, having the chemical composition stated in Table VI.

TABLE VI

| | |
|---|---|
| CO | 10% |
| $CO_2$ | 82% |
| $H_2$ | 2% |
| $H_2O$ | 4% |
| $H_2S$ | 261 ppm |
| $CH_4$ | 1% |
| $N_2$, Ar | 1% |

The export gas emerging from the $CO_2$ stripping means which is fed to a reduction zone 21 of a further direct reduction process via the duct 19 incurs in an amount of 79,718 $Nm^3/h$, having the chemical composition indicated in Table VII.

TABLE VII

| | |
|---|---|
| CO | 61% |
| $CO_2$ | 3% |
| $H_2$ | 30% |
| $H_2O$ | 0% |
| $H_2S$ | 6 ppm |
| $CH_4$ | 1% |
| $N_2$, Ar | 4% |

According to the invention, reducing gas emerging from melter gasifier 8 is branched off via the duct 31, in an amount of 39,952 $Nm^3/h$ and having the chemical composition shown in Table VIII.

TABLE VIII

| | |
|---|---|
| CO | 63% |
| $CO_2$ | 3% |
| $H_2$ | 29% |
| $H_2O$ | 2% |
| $H_2S$ | 200 ppm |
| $CH_4$ | 1% |
| $N_2$, Ar | 2% |

This branched-off reducing gas is mixed with the export gas leaving the $CO_2$ stripping means 17 freed from $CO_2$ to a very large extent and thus forms the reducing gas for the further direct reduction zone 21. It is available in an amount of 119,670 $Nm^3/h$ and has the chemical composition stated in Table IX.

TABLE IX

| | |
|---|---|
| CO | 62% |
| $CO_2$ | 3% |
| $H_2$ | 30% |
| $H_2O$ | 1% |
| $H_2S$ | 71 ppm |
| $CH_4$ | 1% |
| $N_2$, Ar | 4% |

This mixed reducing gas now has to be subjected to heating in the heating means 22 or the afterburning means 25. After having been heated it is fed to the second shaft furnace 20 in an amount of 120,622 $Nm^3/h$, having the chemical composition indicated in Table X, and there is utilized for direct reduction in the reduction zone 21.

TABLE X

| | |
|---|---|
| CO | 59% |
| $CO_2$ | 5% |
| $H_2$ | 28% |

TABLE X-continued

| | |
|---|---|
| $H_2O$ | 2% |
| $H_2S$ | 70 ppm |
| $CH_4$ | 1% |
| $N_2$, Ar | 4% |

In this embodiment of the invention, too, the reducing gas conveyed to the further reduction zone 21 is free from recycle reducing gas, i.e. export gas emerging from the further reduction zone 21 is not, like illustrated in FIG. 1 and 2, fed to the $CO_2$ stripping means 17 via the duct 29, but is put at the exclusive disposal of external users.

As can be seen from a comparison of the two examples, the below-listed advantages arise from the process according to the invention as compared with the prior art:

The export gas compressor 16 can be dimensioned for ¾ of the capacity.

The separate conveyance of the export gas drawn off the shaft furnace 1 and of the reducing gas branched off from the melter gasifier 3 causes the fluctuations conditioned by control engineering to decrease, thus enabling a smoother operation of the compressor 16, the compressor 16 to be dimensioned with less reserve, controlling of the compressor 16 to be simplified, the pressure drop via the $CO_2$ stripping means 17 to be kept constant more easily due to the decrease in the fluctuations in volume that have to be coped with and a more even operation of the $CO_2$ stripping means 17, thereby rendering the plant easier to operate.

Electric power consumption/t of product drops by some 15%, since the motor for the compressor 16 can be dimensioned smaller by more than 25% and is loaded more evenly.

The yield in terms of reducing agents in the reducing gas supplied via the duct 31 is 100%, which leads to an increase in production by 3 to 4%.

Storage tanks for the reducing gas conveyed to the second reduction zone 21 are utilized more efficiently for a better supply of the heating means 22, 25.

The $CO_2$ stripping means 17 can be dimensioned considerably smaller.

The $CO_2$ stripping means 17 exhibits a higher $CO_2$ partial pressure in the fed-in export gas.

It is not necessary to adhere quite as strictly to a residual $CO_2$ content in the export gas freed from $CO_2$: fluctuations are "diluted", i.e. compensated, by means of a reducing gas fed in via the duct 31.

The $H_2S$ content in the offgas from the $CO_2$ stripping means 17 is lower and less offgas incurs.

We claim:

1. A process for the production of molten pig iron or molten steel pre-products and sponge iron from charging materials consisting of iron ore and, if desired, fluxes, said process comprising: carrying out direct reduction of the charging materials to sponge iron in a first reduction zone (12), melting the sponge iron in a meltdown gasifying zone (8) under supply of carbon carriers as well as an oxygen-containing gas whereby a CO—$H_2$-containing reducing gas is produced, feeding the reducing gas to the first reduction zone (12), reacting it there and drawing it off as an export gas, subjecting the drawn-off export gas to $CO_2$ elimination and along with part of the reducing gas formed in the meltdown gasifying zone (8) conveying it as an at least largely $CO_2$ free reducing gas exclusively to a further reduction zone (21) for the direct reduction of iron ore, said process characterized by branching off a portion of the part of the reducing gas produced in the meltdown gasifying zone (8) and conveyed exclusively to the further reduction zone (21) and feeding it to the further reduction zone (21) while avoiding $CO_2$ elimination and heating the export gas subjected to $CO_2$ elimination.

2. A process according to claim 1, characterized in that in the further reduction zone (21), producing sponge iron from iron ore utilizing the fixed-bed method (FIGS. 1, 2).

3. A process according to claim 2, characterized by mixing the branched-off portion of the reducing gas prior to being introduced into the further fixed-bed direct reduction zone (21) with the export gas subjected to $CO_2$ elimination to form a mixed reducing gas.

4. A process according to claim 3, characterized by subjecting the branched-off portion of the reducing gas to dedustification and scrubbing and subjecting the mixed reducing gas to heating (FIG. 1).

5. A process according to claim 1, characterized by subjecting only the portion of the export gas subjected to $CO_2$ elimination to heating and mixing the heated gas with the branched-off portion of the reducing gas, thereby avoiding both $CO_2$ elimination and heating (FIGS. 2, 3).

6. A process according to claim 5, characterized by subjecting the branched-off portion of the reducing gas is only to dedustification but not to scrubbing (FIG. 2, 3).

7. A process according to claim 5, characterized by subjecting the branched-off portion of the reducing gas to dedustification and scrubbing and heating the export gas subjected to $CO_2$ elimination to a temperature slightly above the desired temperature for the reducing gas for the further reduction zone (21).

8. A process according to claim 1, characterized by storing the branched-off portion of the reducing gas prior to introducing it into the further reduction zone (21).

9. A process according to claim 1, characterized by balancing out deviations in pressure within the meltdown gasifying zone (8) by admixing a portion of the reducing gas formed in the meltdown gasifying zone (8) to the export gas drawn off the reduction zone (12) prior to effecting the $CO_2$ elimination of the export gas.

10. A process according to claim 1, characterized by reducing the further reduction zone fine ore by the fluidized bed process (40) and supplying the branched-off reducing gas to the further reduction zone while avoiding heating of the export gas (FIG. 3).

11. A process according to claim 10, characterized by effecting direct reduction in the fluidized bed process in at least two steps (FIG. 3).

12. A plant for the production of pig iron or molten steel preproducts, including a reduction furnace (1) for iron ore, a melter gasifier (3), a feed duct (4) for a reducing gas connecting the melter gasifier with the reduction furnace (1), a conveying duct (13) for the reduction product produced in the reduction furnace (1) connecting the reduction furnace (1) with the melter gasifier (3), with an export gas-discharge duct (14) departing from the reduction furnace (1) and opening into a $CO_2$ elimination plant (17), with feed ducts (6, 7) for oxygen-containing gases and carbon carriers running into the melter gasifier (3), a tap (11) for pig iron (9) and slag (10) being provided at the melter gasifier (3), and with at least one additional reduction reactor (20; 36, 37) intended to receive iron ore, a reducing gas feed duct (19) departing from the $CO_2$ elimination plant (17) and leading to the reduction reactor (20; 36, 37), with the $CO_2$ elimination plant (17) being flow-connected exclusively with the reduction reactor (20; 36, 37), an offgas discharge duct (30) leading out of this reduction reactor (20; 36, 37) and a discharging means for the reduction product formed in this reduction reactor (20; 36, 37), characterized in that the reducing gas-feed duct (19) of the additional reduction reactor (20; 36, 37) runs into the additional reduction reactor (20; 36, 37) via a heating means (22, 25) for the export gas freed from $CO_2$, and that from the feed duct (4) for the reducing gas connecting the melter gasifier (3) with the reduction furnace (1) a branch duct (31) departs which runs into the reducing gas feed duct (19) of the additional reduction reactor (20; 36, 37) while avoiding the $CO_2$ elimination plant (17).

13. A plant according to claim 12, characterized in that the additional reduction reactor is a fixed-bed reactor (20) for iron ore (FIG. 1, 2).

14. A plant according to claim 12, characterized in that the branch duct (31) runs into the reducing gas feed duct (19) of the additional reduction reactor (20; 36, 37) while avoiding both the $CO_2$ elimination plant (17) and the heating means (22) which may optionally include an afterburning means (25) (FIG. 2, 3).

15. A plant according to claim 12, characterized in that the additional reduction reactor is a fluidized bed reactor (36, 37) (FIG. 3).

16. A plant according to claim 15, characterized in that at least two fluidized bed reactors (36, 37) are provided which are connected in series (FIG. 3).

17. A plant according to claim 12, characterized in that a compensation tank (31') is provided in the branch duct (31).

18. A plant according to claim 17, characterized in that the compensation tank (31') is bypassed by a bypass duct (31").

19. A plant according to claim 12, characterized in that the branch duct (31) is connectible with the export gas discharge duct (14) via a compensating duct (35) prior to the entry of the same into the $CO_2$ elimination plant (17).

20. A process according to claim 1, wherein said iron ore is lumpy or pelletized iron ore.

* * * * *